(12) United States Patent
Kimoto et al.

(10) Patent No.: US 10,239,209 B2
(45) Date of Patent: Mar. 26, 2019

(54) ROBOT SIMULATION DEVICE FOR HUMAN INTERVENTION-TYPE ROBOT SYSTEM

(71) Applicant: FANUC CORPORATION, Yamanashi (JP)

(72) Inventors: Yuuki Kimoto, Yamanashi (JP); Yoshiharu Nagatsuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 113 days.

(21) Appl. No.: 15/214,464

(22) Filed: Jul. 20, 2016

(65) Prior Publication Data

US 2017/0021501 A1    Jan. 26, 2017

(30) Foreign Application Priority Data

Jul. 21, 2015  (JP) ................................ 2015-144229

(51) Int. Cl.
    *B25J 9/16*        (2006.01)
(52) U.S. Cl.
    CPC ... *B25J 9/1671* (2013.01); *G05B 2219/40202* (2013.01)
(58) Field of Classification Search
    CPC .................................................. B25J 9/1671
    See application file for complete search history.

(56) References Cited

U.S. PATENT DOCUMENTS

| 7,860,614 | B1* | 12/2010 | Reger | B25J 9/1671 |
| | | | | 700/10 |
| 8,315,735 | B2* | 11/2012 | Nihei | B25J 9/1676 |
| | | | | 318/568.11 |
| 9,671,777 | B1* | 6/2017 | Aichele | G05B 19/4069 |
| 9,737,989 | B2* | 8/2017 | Naitou | B25J 9/1633 |
| 9,811,074 | B1* | 11/2017 | Aichele | G05B 19/4069 |
| 2010/0191372 | A1* | 7/2010 | Nihei | B25J 9/1676 |
| | | | | 700/245 |
| 2013/0184871 | A1 | 7/2013 | Fudaba et al. | |
| 2013/0184980 | A1 | 7/2013 | Ichikawa et al. | |
| 2016/0243700 | A1* | 8/2016 | Naitou | B25J 9/1633 |

FOREIGN PATENT DOCUMENTS

| JP | 6-96087 A | 4/1994 |
| JP | 08-141960 A | 6/1996 |
| JP | 2004-17256 A | 1/2004 |
| JP | 2007-76807 A | 3/2007 |

(Continued)

*Primary Examiner* — Nicholas J Tobergte
(74) *Attorney, Agent, or Firm* — Hauptman Ham LLP

(57) ABSTRACT

A robot simulation device, by which a calculation of a cycle time and a simulation of a human intervention-type robot system can be easily carried out with less effort by an operator. The simulation device has: an operation distributing part which distributes a plurality of operations to the robot and the human, based on a weight of an article to be worked in each operation, a conveying distance of the article, and a required time in each operation; a program generating part which generates a motion program for the robot and the human based on a result of distribution of operations obtained by the operation distributing part; and a cycle time calculating part which executes a simulation of the motion program and calculates a cycle time of the motion program.

4 Claims, 5 Drawing Sheets

(56) References Cited

FOREIGN PATENT DOCUMENTS

| | | |
|---|---|---|
| JP | 2007-283450 A | 11/2007 |
| JP | 2009-297880 A | 12/2009 |
| JP | 2010-211726 A | 9/2010 |
| JP | 2011-152615 A | 8/2011 |
| JP | 2011-227773 A | 11/2011 |
| JP | 2014-142814 A | 8/2014 |
| WO | 2012/039280 A1 | 3/2012 |
| WO | 2012/101956 A1 | 8/2012 |

* cited by examiner

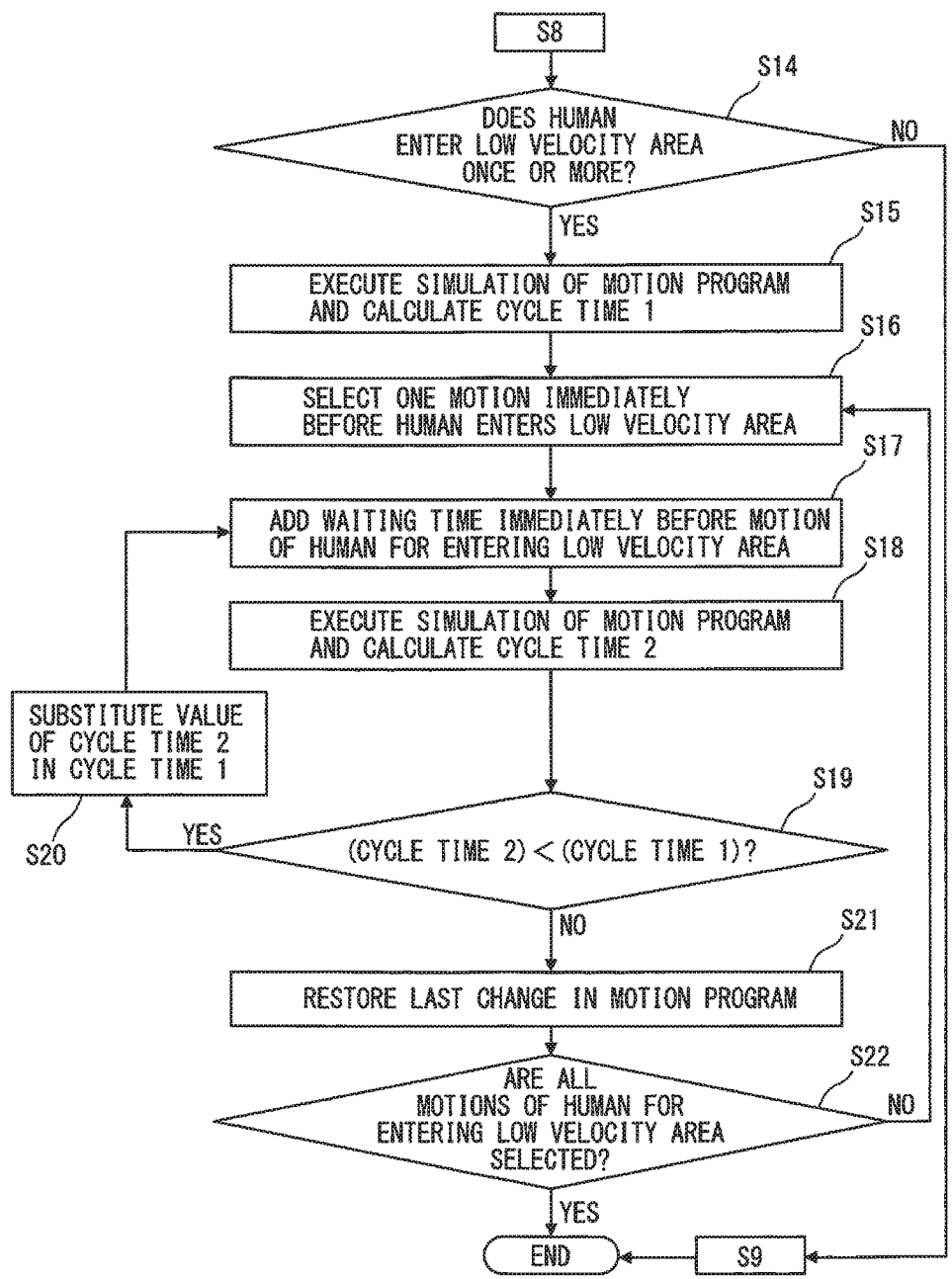

ROBOT SIMULATION DEVICE FOR HUMAN INTERVENTION-TYPE ROBOT SYSTEM

RELATED APPLICATIONS

The present application claims priority to Japanese Patent Application Number 2015-144229 filed Jul. 21, 2015, the disclosure of which is hereby incorporated by reference herein in its entirety.

BACKGROUND OF THE INVENTION

1. Field of the Invention

The preset invention relates to a robot simulation device for carrying out a simulation of a human intervention-type robot system, used in a robot offline system.

2. Description of the Related Art

In a recent production system for assembling components, etc., a human intervention-type robot system may be used, in which a human intervention-type robot for carrying out a cooperative operation with a human is operated. In such a robot system, it may be necessary to carry out a simulation in an offline system, before an actual system is operated.

As a related art document, JP 2010-211726 A discloses a simulation method including the steps of: designating a motion property including a movable range and a motion velocity of each body site of an operator; calculating a time required for a production operation production with cooperation between the operator and a robot by simulating the motion for each combination of allocable positions of the operator and allocable positions of the robot; and determining the combination of the operator position and the robot position, the combination having the shortest required time among the calculated required times.

The technique of JP 2010-211726 A is intended to make it possible to execute a simulation of the human by designating a movable range and a motion velocity of the human, and optimize a cycle time by changing the positions of the human and the robot. However, in the method of the prior art, it is necessary to determine contents of the operations and the motion velocities of the robot and the human, before executing the simulation. Further, in the prior art, the cycle time is optimized by changing the positions of the robot and the human, while a motion program is not changed for optimizing the cycle time.

SUMMARY OF THE INVENTION

Therefore, an object of the present invention is to provide a robot simulation device, by which a calculation of a cycle time and a simulation of a human intervention-type robot system can be easily carried out with less effort by an operator.

To achieve the above object, the present invention provides a robot simulation device for a human intervention-type robot system in which a robot and a human located in a virtual space carry out a cooperative operation for sharing a working space and conveying one or more article, the robot simulation device comprising: an operation distributing part which distributes a plurality of operations included in the cooperative operation to the robot and the human, based on a weight of the article to be worked in each operation, a conveying distance of the article, and a required time in each operation; a program generating part which generates a motion program for the robot and the human based on a result of distribution of operations obtained by the operation distributing part; and a cycle time calculating part which executes a simulation of the motion program and calculates a cycle time of the motion program.

The robot simulation device may further comprise an execution judging part which judges as to whether or not the operation distributed to the robot can be carried out by the robot or whether or not the operation distributed to the human can be carried out by the human, based on a condition other than the weight of the article to be worked in each operation, the conveying distance of the article, and the required time in each operation.

The robot simulation device may further comprise a motion velocity judging part which judges as to whether or not the robot can be operated at a velocity equal to or higher than a motion velocity of the human, when the operation distributing part distributes an operation to the robot and the human in which the robot and the human cooperatively convey one article. In this case, the program generating part may generate the motion program in which the velocity of the human is set to a maximum velocity of the robot, when the motion judging part judges that the robot cannot be operated at the velocity equal to or higher than the motion velocity of the human.

The robot simulation device may further comprise: a motion velocity limiting part which reduces a motion velocity of the robot when the human approaches to the robot being operated within a constant distance of the robot, in case that the operation distributing part distributes different operations to the robot and the human; and a cycle time extension limiting part which add a waiting time to the motion program so as to prevent the cycle time when the robot and the human cooperatively operate from being extended due to a delay in the motion velocity of the robot occurred by approach of the human to the robot.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 7 is a flowchart explaining a procedure for limiting extension of a cycle time, when a low-velocity area is defined around the robot.

DETAILED DESCRIPTIONS

Figure 1:
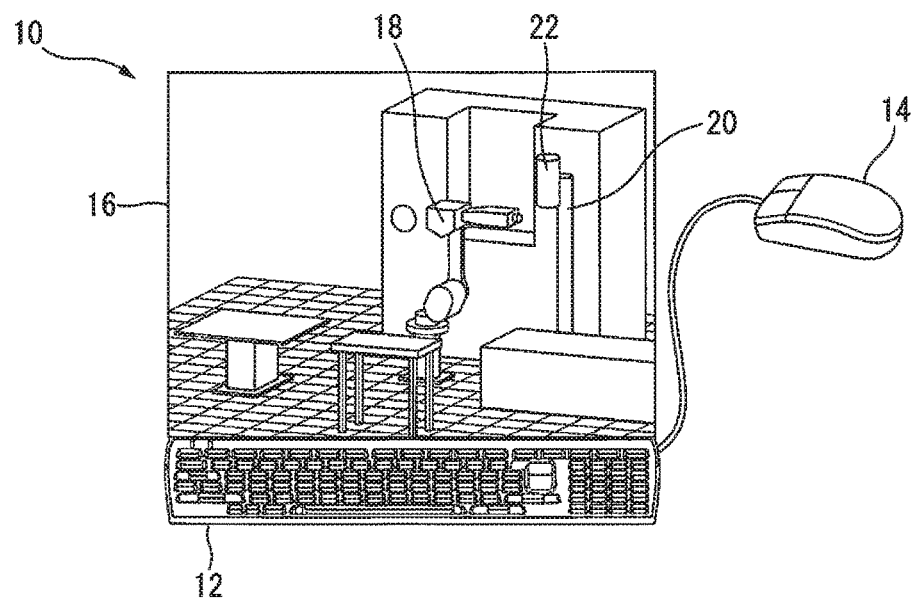
FIG. 1 is an example of a system configuration of a robot simulation device according to a preferred embodiment of the present invention.
Figure 2:
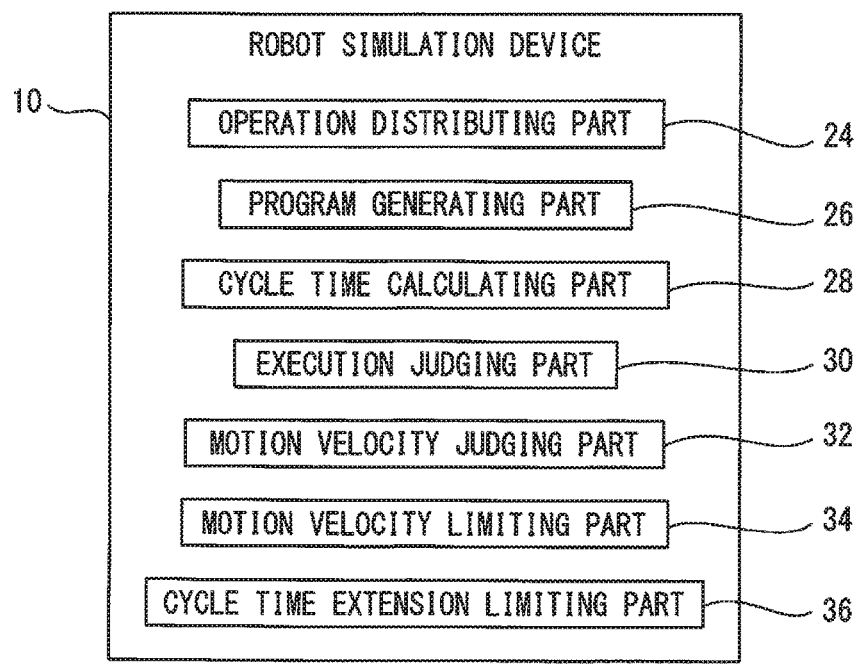
FIG. 2 is a functional block diagram of the robot simulation device of FIG. 1.

FIG. 1 is an example of a system configuration of a robot simulation device (hereinafter, also referred to as merely a "simulation device") 10 according to a preferred embodiment of the present invention, and FIG. 2 is a functional block diagram of the simulation device. For example, simulation device 10 is a personal computer having an input device such as a keyboard 12 and/or a mouse 14, and is configured to execute a simulation of a human intervention-type robot system in which a robot 18 and a human (or an operator) 20 located in a virtual space (or on a display) 16 carry out a cooperative operation, whereby the robot and the human share a working space and convey one or more article 22. Simulation device 10 includes: an operation distributing part 24 which distributes a plurality of operations included in the cooperative operation to robot 18 and human 20, based on a weight of an article 22 to be worked in each operation, a conveying distance of article 22, and a required time in each operation; a program generating part 26 which generates a motion program for robot 18 and human 20 based on a result of distribution of operations obtained by operation distributing part 24; and a cycle time calculating part 28 which executes a simulation of the motion program and calculates a cycle time of the motion program.

Figure 3:
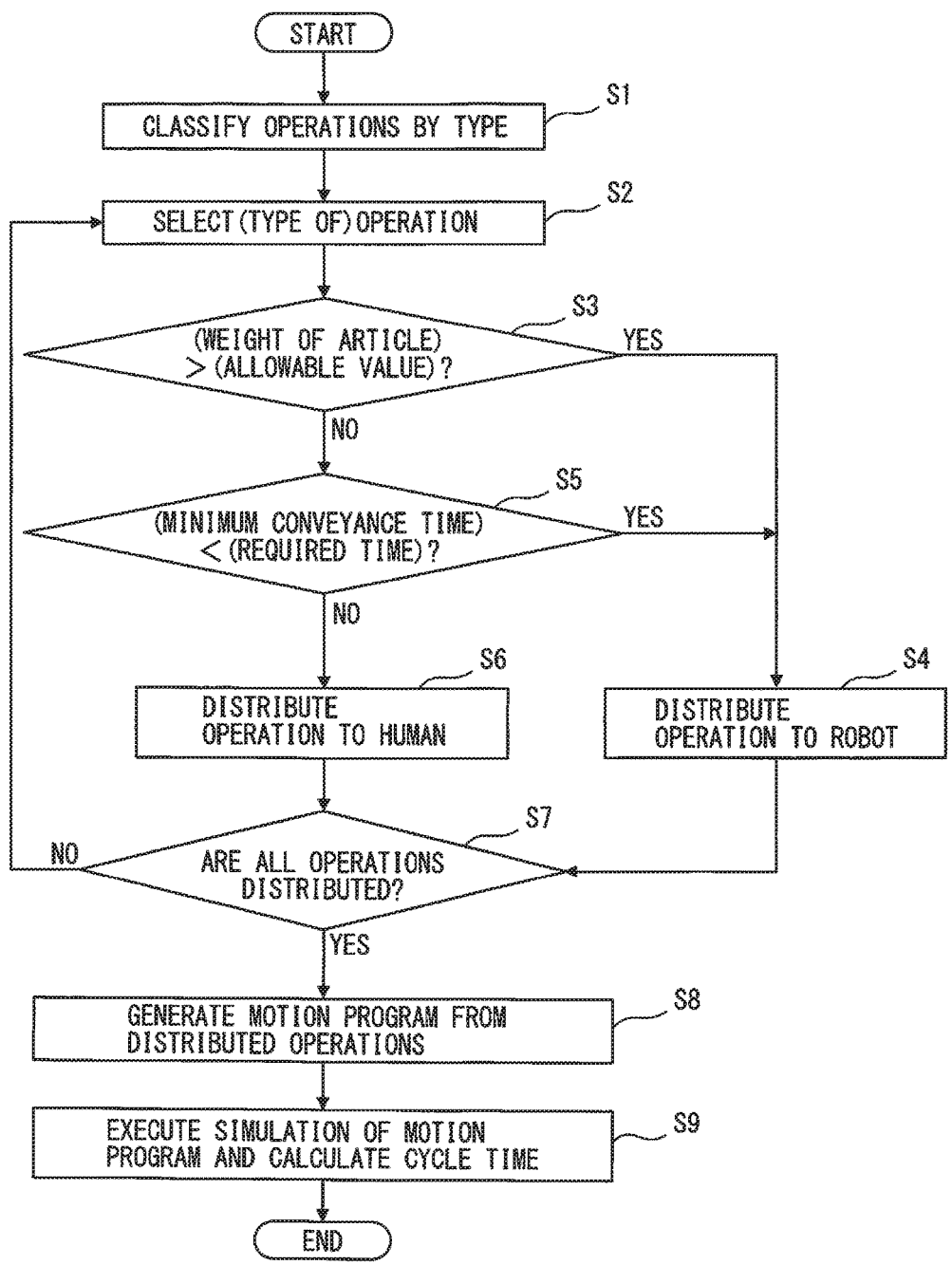
FIG. 3 is a flowchart showing an example of a procedure in the robot simulation device of the invention.
Figure 4:
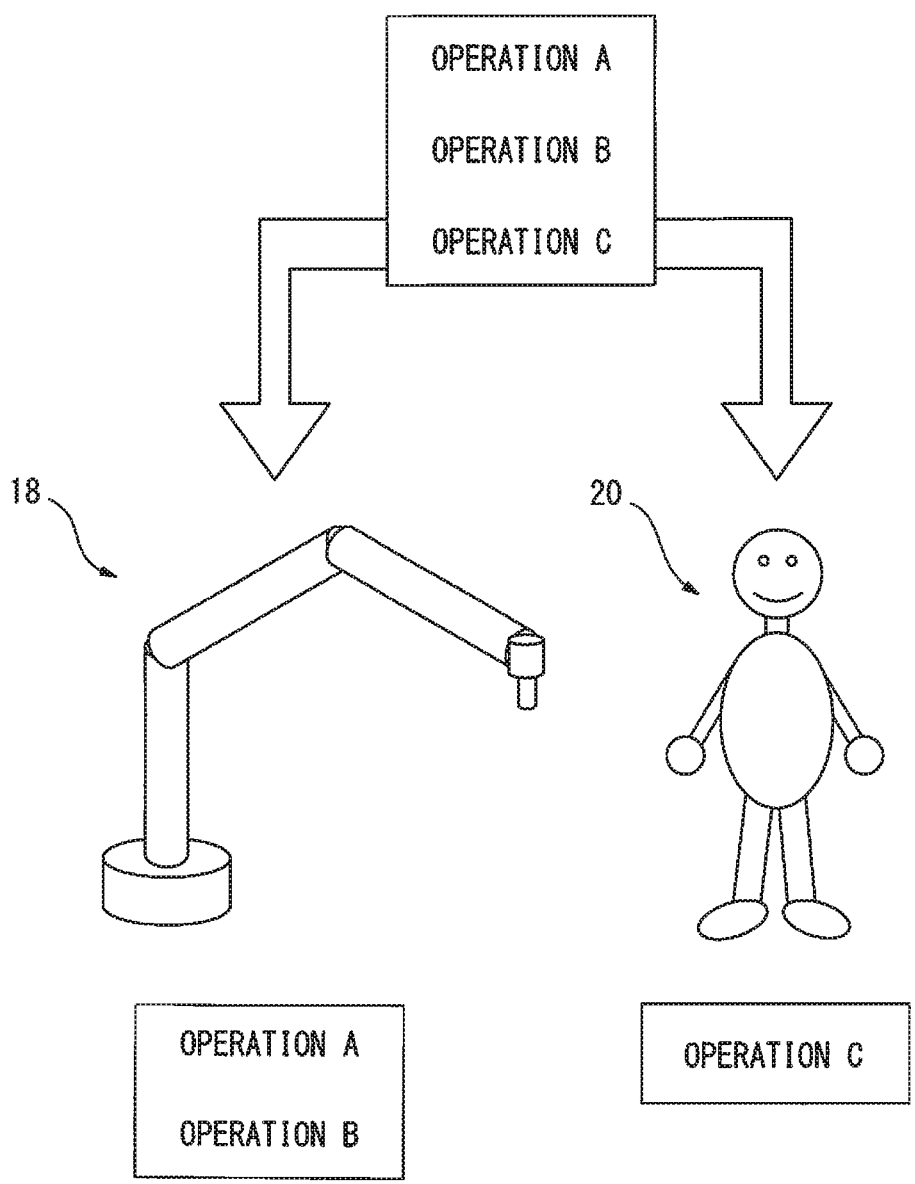
FIG. 4 shows an example in which a plurality of operations is respectively distributed to a robot and a human.

Next, with reference to a flowchart of FIG. 3, the function of simulation device 10 will be explained. First, in step S1, a plurality of operations to be carried out by the human intervention-type robot system is classified by type. In this embodiment, as exemplified in FIG. 4, the plurality of operations is classified as types A, B and C.

Next, in step S2, one type of operation is selected from the classified operations by type, and a weight of the article to be worked in the selected operation is compared to a predetermined allowed value (step S3). If the weight of the article exceeds the allowable value, the selected operation is distributed to the robot (step S4). For example, the allowable value is set so that the human can convey the article.

When the weight of the article does not exceed the allowable value, in step S5, it is judged as to whether or not a minimum convey time (D/Vmax), obtained by dividing a convey distance D of the article by a maximum velocity Vmax of the robot, is equal to or higher than a predetermined required time. When the minimum convey time is lower than the required time, the corresponding operation can be carried out by the robot within the required time, and thus the operation is distributed or assigned to the robot (step S4). On the other hand, when the minimum convey time is equal to or higher than the required time, the corresponding operation is distributed or assigned to the human (step S6), since the motion velocity of the human is normally higher than the robot. For example, in FIG. 4, operations A and B are distributed to robot 18, and operation C is distributed to human 20.

In the next step S7, it is judged as to whether or not all of the operations are distributed. When one or more operation is not distributed, the procedures from S2 to S6 are repeated. As such, all of the operations classified by type are respectively assigned to the human or the robot.

After all of the operations are distributed, a motion program of the robot and the human is generated based on a result of the distribution (step S8). Then, a simulation of the generated motion program is executed, so that a cycle time of the simulation in the human intervention-type system is calculated (step S9).

As explained, in the present invention, each of the plurality of operations can be automatically assigned (or distributed) to the robot or the human based on the weight of the article and the required time (or the convey time), and the motion program generated by the result of distribution can be simulated. Therefore, the cycle time of the human intervention-type robot system can be automatically and appropriately calculated and evaluated.

As shown in FIG. 2, simulation device 10 may further have an execution judging part 30 which judges as to whether or not the operation distributed to the robot by operation distributing part 24 can be carried out by the robot or whether or not the operation distributed to the human by operation distributing part 24 can be carried out by the human, based on a condition other than the weight of the article to be worked in each operation, the conveying distance of the article, and the required time in each operation. Optionally, after step S4 or S6 in FIG. 3, it may be judged as to whether or not the operation distributed to the robot or the human can be carried out by the robot or the human based on the other condition.

Figure 5:
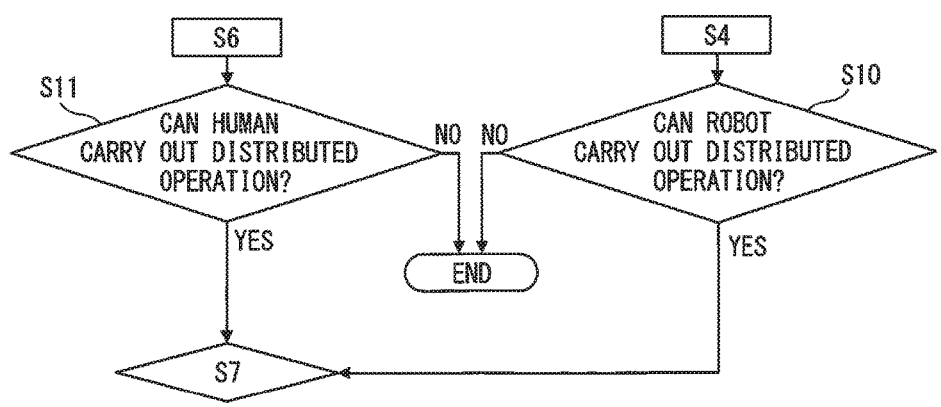
FIG. 5 is a flowchart explaining a procedure for judging as to whether the operation distributed to the robot or the human can be carried out by the robot or the human to which the operation is distributed.

As exemplified in FIG. 5, step S10 may be inserted after step S4, so as to judge as to whether or not the operation distributed to the robot (in the example of FIG. 4, operations A and B) can be carried out by the robot. As a concrete condition thereof, as to whether the distributed operation can be carried out by the robot within the movable range of the robot, or as to whether the motion velocity of the robot during the distributed operation does not exceed the allowable velocity of the robot, may be used. When such a condition is satisfied, the procedure progresses to step S7 of FIG. 3. Otherwise, since the operation distributed to the robot cannot be carried out by the robot, it is preferable to terminate the procedure.

Similarly, as shown in FIG. 5, step S11 may be inserted after step S6, so as to judge as to whether or not the operation distributed to the human (in the example of FIG. 4, operation C) can be carried out by the human. As a concrete condition thereof, as to whether the distributed operation can be carried out by the human within the movable range of the human, or as to whether the motion velocity of the human during the distributed operation does not exceed the allowable velocity of the human, may be used. When such a condition is satisfied, the procedure progresses to step S7 in FIG. 3. Otherwise, since the operation distributed to the human cannot be carried out by the human, it is preferable to terminate the procedure.

As shown in FIG. 2, simulation device 10 may further have a motion velocity judging part 32 which judges as to whether or not the robot can be operated at a velocity equal to or higher than the motion velocity of the human, when operation distributing part 24 distributes an operation to the robot and the human in which the robot and the human cooperatively convey one article.

Figure 6:
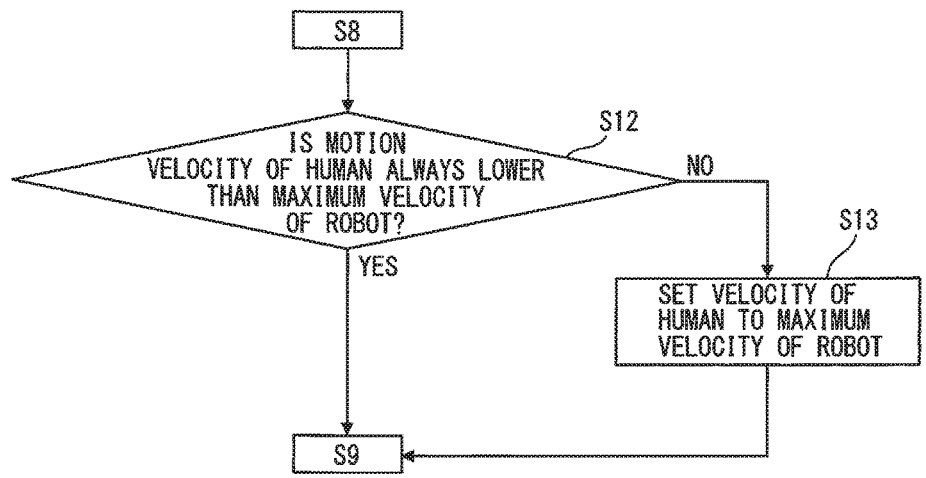
FIG. 6 is a flowchart explaining a procedure for judging as to whether the robot can be operated at the same velocity as a motion program of the human when an operation is distributed to the robot and the human in which the robot and the human cooperatively convey one article.

The operation in which the robot and the human cooperatively convey one article is distributed to both the robot and the human. In this case, as shown in FIG. 6, after program generating part 26 generates the motion program (for example, after step S8 in FIG. 3), motion velocity judging part 32 may insert step S12 for judging as to whether or not the robot can be operated at the velocity equal to or higher than the motion velocity of the human. In general, the motion velocity of the human is higher than the robot. Therefore, when it is judged that the robot cannot be operated at the velocity equal to or higher than the motion velocity of the human, program generating part 26 generates the motion program so that the motion velocity of the human is set to the maximum velocity of the robot (i.e., the motion velocity of the human is lowered) (step S13). On the other hand, when the motion velocity of the human is always lower than the maximum velocity of the robot, the procedure progresses to step S9 without executing step S13. By virtue of such a procedure, a problem, in which the simulation cannot be properly executed due to the low motion velocity of the robot, can be avoided.

Further, as shown in FIG. 2, simulation device 10 may further have a motion velocity limiting part 34 which reduces the motion velocity of the robot when the human approaches to the robot being operated within a constant distance of the robot, in case that operation distributing part 24 distributes different operations to the robot and the human; and a cycle time extension limiting part 36 which add a waiting time to the motion program so as to prevent the cycle time when the robot and the human cooperatively operate from being extended due to a delay in the motion velocity of the robot occurred by approach of the human to the robot. An example of the procedure by motion velocity limiting part 34 and cycle time extension limiting part 36 will be explained with reference to a flowchart of FIG. 7.

Motion velocity limiting part 34 has a function for reducing the motion velocity of the robot when the human approaches to the robot being operated within the constant distance of the robot, in case that the different operations are respectively distributed to the robot and the human. In other words, motion velocity limiting part 34 is configured to define an area within a predetermined distance from the robot as a low-velocity area, and reduce the motion velocity of the robot when the human enters the low-velocity area.

As shown in FIG. 7, after program generating part 26 generates the motion program (for example, after step S8 in FIG. 3), it is judged as to whether or not at least one motion in which the human enters the low-velocity area is included in the motion program (step S14). When the motion in which the human enters the low-velocity area is included in the motion program, a simulation based on the motion program is executed, and an execution time (or a cycle time) of the motion program is calculated (step S15). The calculated cycle time is stored in a suitable memory as a first cycle time (or cycle time 1).

Next, in the motion program for the human, one motion before (for example, immediately before) the human enters the low-velocity area is selected (step S16), and a waiting command including a predetermined waiting time is inserted immediately before the selected motion (step S17). Then, a simulation is executed based on the motion program to which the waiting command (waiting time) is added, and an execution time (or a cycle time) of the motion program is calculated as a second cycle time (or cycle time 2) (step S18). For example, the predetermined waiting time is set to a (preferably, constant) value from two seconds to ten seconds.

In the next step S19, the first and second cycle times are compared to each other. When the cycle time after adding the waiting command (i.e., the second cycle time) is lower than the first cycle time, the second cycle time is substituted for the first cycle time (step S20). Then, the waiting time is added to the motion program and the first and second cycle times are compared to each other again. This procedure is repeated until cycle time 2 is equal to or higher than cycle time 1.

When the second cycle time is equal to or higher than the first cycle time in step S19, it could be understood that the lastly added waiting command (or the waiting time) is not necessary, and thus the last change in (or addition of) the motion program of the human program is canceled (step S21). In addition, it is preferable that the procedure for adding the waiting command (waiting time) as described above be executed with respect to all of the motions in which the human enters the low-velocity area (step S22).

The example of FIG. 7 is intended to avoid the motion velocity of the robot from being lowered (and the cycle time is extended) due to entering of the human into the low-velocity area, and thus the example of FIG. 7 indicates a concrete means for adding the waiting time in order to delay a timing when the human enters the low-velocity area, whereby the robot can rapidly carry out the operation without reducing the motion velocity thereof. Further, in the example of FIG. 7, by comparing the cycle time between before and after the waiting time is added at appropriate time intervals, the motion program having the minimum cycle time can be automatically generated.

In addition, the examples as shown in FIGS. 5 to 7 may be used independently or in combination with each other.

In the example of FIG. 1, the robot simulation device of the present invention is explained as a personal computer. However, the robot simulation device may be included in the robot controller for controlling the actual robot to be simulated. In other words, the robot controller may have the functions of the robot simulation device. By virtue of this, the simulation of the human intervention-type robot system can be carried out by the robot controller, whereby the motion of the actual robot can be smoothly carried out based on the result of the simulation.

According to the present invention, a plurality of operations can be automatically distributed to a robot and a human, based on a weight of an article to be worked in each operation, a conveying distance of the article, and a required time in each operation, so that the motion program of the human and the robot is simulated so as to calculate a cycle time of the motion program. Therefore, the operator can easily simulate the human intervention-type robot system and evaluate the cycle time thereof with less effort.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot simulation device for a human intervention-type robot system in which a robot and a human located in a virtual space carry out a cooperative operation for sharing a working space and conveying one or more article, the robot simulation device comprising:
   an operation distributing part which distributes a plurality of operations included in the cooperative operation to the robot and the human, based on a weight of the article to be worked in each operation, a conveying distance of the article, and a required time in each operation;
   a program generating part which generates a motion program for the robot and the human based on a result of distribution of operations obtained by the operation distributing part; and
   a cycle time calculating part which executes a simulation of the motion program and calculates a cycle time of the motion program, wherein
   a simulation result of the executed simulation is applied to carry out an actual cooperative operation between the human and the robot.

2. The robot simulation device as set forth in claim 1, further comprising:
   an execution judging part which judges as to whether or not the operation distributed to the robot can be carried out by the robot or whether or not the operation distributed to the human can be carried out by the human, based on a condition other than the weight of the article to be worked in each operation, the conveying distance of the article, and the required time in each operation.

3. The robot simulation device as set forth in claim 1, further comprising:
a motion velocity judging part which judges as to whether or not the robot can be operated at a velocity equal to or higher than a motion velocity of the human, when the operation distributing part distributes an operation to the robot and the human in which the robot and the human cooperatively convey one article,
wherein the program generating part generates the motion program in which the velocity of the human is set to a maximum velocity of the robot, when the motion judging part judges that the robot cannot be operated at the velocity equal to or higher than the motion velocity of the human.

4. The robot simulation device as set forth in claim 1, further comprising:
a motion velocity limiting part which reduces a motion velocity of the robot when the human approaches to the robot being operated within a constant distance of the robot, in case that the operation distributing part distributes different operations to the robot and the human; and
a cycle time extension limiting part which add a waiting time to the motion program so as to prevent the cycle time when the robot and the human cooperatively operate from being extended due to a delay in the motion velocity of the robot occurred by approach of the human to the robot.

* * * * *